United States Patent [19]

Carossi et al.

[11] Patent Number: 4,700,067

[45] Date of Patent: Oct. 13, 1987

[54] APPARATUS FOR CHECKING ATMOSPHERIC POLLUTION DUE TO ALPHA PARTICLE EMITTING AEROSOLS

[75] Inventors: Jean-Claude Carossi, Pierrevert; David Da Costa Viera, Puyricard; Claude Thirion, Beaumont De Pertuis, all of France

[73] Assignee: Commissariat a l'Energie Atomique, Paris, France

[21] Appl. No.: 727,450

[22] Filed: Apr. 26, 1985

[30] Foreign Application Priority Data

Apr. 27, 1984 [FR] France .................................. 8406690

[51] Int. Cl.⁴ .............................................. G01T 1/02
[52] U.S. Cl. .................................... 250/380; 250/435; 250/370; 250/504
[58] Field of Search ........... 250/380, 435, 432, 370 A, 250/364, 472.1, 304

[56] References Cited

U.S. PATENT DOCUMENTS

| 2,497,823 | 2/1950 | Molloy | 250/435 |
| 3,922,555 | 11/1975 | Chapuis et al. | 250/472.1 |
| 4,185,199 | 1/1980 | Droullard et al. | 250/435 |
| 4,186,303 | 1/1980 | Smith et ál. | 250/472.1 |
| 4,253,025 | 2/1981 | Fergus | 250/394 |
| 4,385,236 | 5/1983 | Hassib et al. | 250/472.1 |
| 4,442,358 | 4/1984 | Kreiner | 250/364 |

Primary Examiner—Carolyn E. Fields
Assistant Examiner—Richard Hanig
Attorney, Agent, or Firm—Cesari and McKenna

[57] ABSTRACT

Apparatus for checking atmospheric pollution by alpha particle-emitting aerosols includes a filter, a detector positioned facing the filter and a unique grid positioned between the filter and the detector. The grid is constituted by radial plates perpendicular to the filter and the detector extending over the entire distance between the latter and defining cells, each of which is open towards the outside of the space between the filter and the detector.

2 Claims, 4 Drawing Figures

APPARATUS FOR CHECKING ATMOSPHERIC POLLUTION DUE TO ALPHA PARTICLE EMITTING AEROSOLS

BACKGROUND OF THE INVENTION

The present invention relates to an apparatus for checking atmospheric pollution, which is more particularly applicable to atmospheres polluted by alpha particle emitting aerosols.

The invention is more particularly applicable to the case where the aerosols contain plutonium, uranium, curium or other elements, whereof the energies of the alpha particles are generally below 6 MeV. When it is wished to detect such aerosols, the decay products of radon isotopes contained in the atmosphere and which are themselves alpha particle emitters, are highly prejudicial to the measurements, particularly radium A (Po-218) and thorium C (Bi-212), which have an emission energy of 6 MeV, radium C' (Po-214) having an emission energy of 7.7 MeV and thorium C' (Po-212) having an emission energy of 8.8 MeV.

The conventional method used for detecting these aerosols consists of sucking air through a filter, which stops the aerosol. This filter is placed in front of a spectrometric detector associated with amplitude selectors making it possible to discriminate the emissions due to the radon from those due to the aerosols in question. The often circular detector is positioned parallel to the filter and facing the same, on the side where the aerosols are trapped and at a distance of a few millimeters. This space is necessary to permit the passage of the gaseous stream carrying the aerosols. The energy of the alpha particles emerging from the filter towards the detector is partly absorbed by the air. Certain particles follow a path which is perpendicular to the filter and detector, whilst others follow a more or less sloping path. Thus, for a given emission energy, the alpha particles are detected with an energy which becomes smaller the longer the path which they have followed in the air, i.e. the more it is inclined with respect to the direction perpendicular to the filter and the detector. This energy loss leads to a superimposing of the "degraded" energies of the alpha particles of the decay products of the radon isotopes and the lower energies of the alpha particles of the isotopes which it is wished to detect.

FIG. 1 is a graph giving the number N of alpha particles detected as a function of the emission energy E. This graph shows two peaks, one of which corresponds to the alpha particles of the radium C', whilst the other corresponds to the alpha particles of the radium A and thorium C. Those particles have undergone an energy loss by interaction with air. Their remaining degraded energy is of the same order of magnitude as that of the alpha particles of e.g. plutonium 238 and is superimposed on the energy peak of the latter. The hatched area A to the left of the peak corresponding to the radium A and thorium C corresponds to spurious pulses due to the radon in the window useful for detecting plutonium 238.

Two solutions have been provided for obviating this disadvantage. The first consists of arranging a grid with closed cells between the filter and the detector for stopping the alpha particles which do not follow a direction quasi-perpendicular to the latter. Thus, such an apparatus is illustrated in FIG. 2, where it can be seen that it comprises a filter 2 shaped like a flat disk and a detector 4 having a circular shape and having a planar detection face 6 facing filter 2. Between filter 2 and face 6 of detector 4 is arranged a grid 8' having a certain number of cells 10. The grid whose periphery is closed by plates perpendicular to the filter and detector, each cell being open, on the one hand, on the side of the filter and, on the other, on the side of the detector. Generally, the cells have a square cross-section, the side length being approximately 1 mm, whilst the total grid thickness is generally a few millimeters. Although this apparatus stops the alpha particles following an inclined path with respect to the direction perpendicular to the filter and detector, it suffers from the disadvantage that in order to permit the passage of the gaseous stream carrying the alpha particles, it is necessary to provide a space between the filter and the grid. This leads to a by no means negligible spacing between the filter and detector, which causes a supplementary energy loss of alpha particles of aerosols trapped on the filter and which it is wished to detect.

Another method consists of using algorithms for evaluating the number of spurious alpha particles and they are eliminated by removal from the recorded spectrum. However, this method leads to imprecise results.

SUMMARY OF THE INVENTION

The object of the present invention is to eliminate these disadvantages by proposing an apparatus for checking contamination making it possible to directly measure the energy of the alpha particles of the aerosols without any significant loss in the detection efficiency and without requiring supplementary calculations.

In per se known manner, pollution checking apparatus according to the invention has a flat filter which holds back the aerosols, a detector having a planar detection face facing the filter and parallel thereto and a grid positioned between the filter and said planar face of the detector. According to the invention, the grid comprises a plurality of plates arranged both radially and perpendicularly to the filter and to said planar detector face. Each plate extends over the entire distance between the filter and the planar face and the plates define between them cells, each of which is open towards the outside of the space between the filter and the detector.

According to a preferred embodiment, the filter and the planar face of the detector are circular, thus defining a cylindrical space. The plates constituting the grid pass through the axis of said cylindrical space and form sectors which are open towards the outside.

Although, according to the preferred embodiment of the invention, the filter and detector are circular, other shapes are possible (e.g. polygonal). However, in all cases, the apparatus must have an axis of symmetry perpendicular to the filter and detector, in order that the air flow is regularly distributed around the entire apparatus. In all cases, the plates extend in a direction containing the axis of symmetry, i.e. in a radial direction, even if the shape of the apparatus is not circular. It is in this sense that it is necessary to understand the expression "arranged radially" used in the present text. Moreover, this arrangement means that the air can penetrate up to the center of the apparatus and the aerosols are regularly distributed over the entire surface of the filter.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
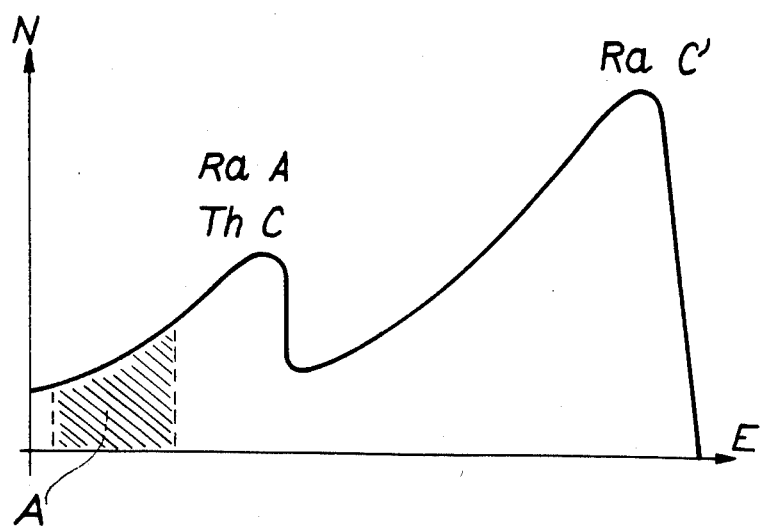
FIG. 1, a graph indicating the number of alpha particles detected as a function of the emission energy.
Figure 2:
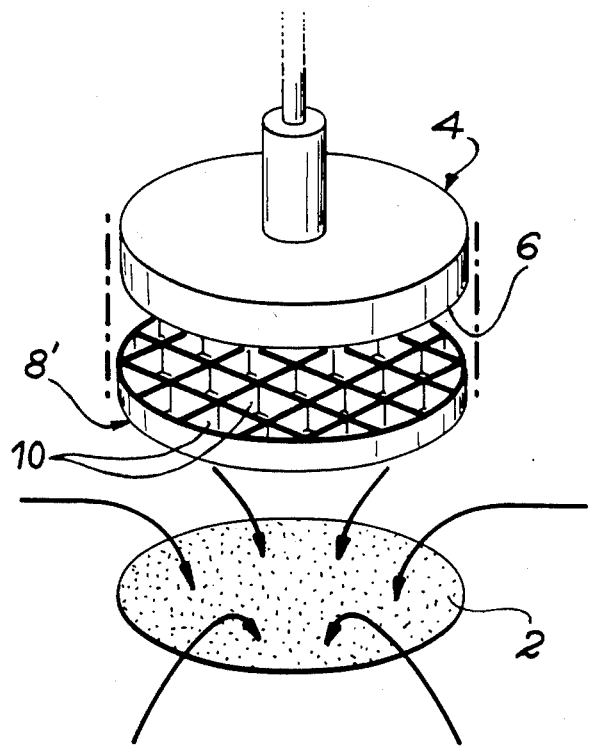
FIG. 2, already described, a diagrammatic perspective view of a prior art checking apparatus.
Figure 3:
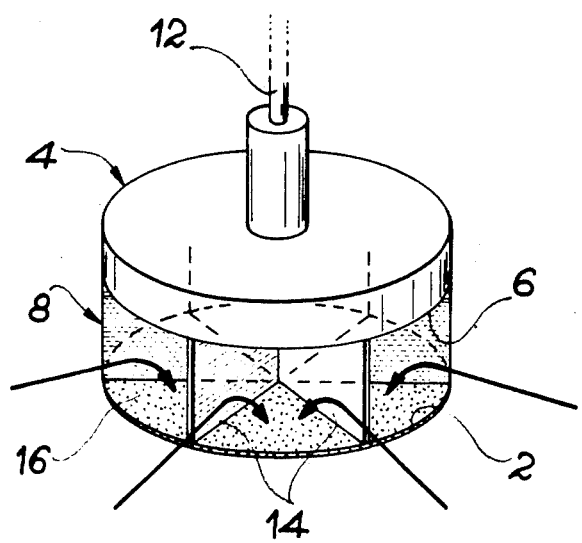
FIG. 3 a diagrammatic perspective view of an apparatus according to the invention.

FIG. 3 illustrates an apparatus according to the invention which comprises, in conventional manner, a filter 2 facing a planar face 6 of a detector 4, the latter being connected to measuring means by a group of electrical wires 12. A grid 8 is arranged between filter 2 and detector 4. In the special case described here, filter 2 and detector 4 are circular. Grid 8 comprises six plates 14 arranged both perpendicularly to filter 2 and detector face 6 and radially relative to the axis of symmetry of the cylinder defined by the filter and the detector face 6. In this case, there are six plates forming between them an angle of 60°, but it would not pass beyond the scope of the invention to modify the number of plates. It can be seen that two adjacent plates define between them a cell or cavity shaped like a sector 16, which is open on the outside of the cylinder defined by filter 2 and detector 4.

This arrangement means that the air streams carrying the aerosols radially penetrate the open sectors of the grid, which is in contact both with the filter and the detector. As a result of the partitioning, the air path P of an alpha particle is always less than the maximum value, which for angles of 60° or less, is equal to:

$$P_{max} = (r^2 + d^2)^{1/2} \quad (1)$$

in which r designates the radius of the filter and the detector, d designates the distance between filter 2 and the face 6 of detector 4.

By combining this equation (1) with the GEIGER law, which gives the free passage of an alpha particle in air as a function of its emission energy, it is possible to optimize the geometry of the apparatus to prevent the energy detected for a progeny of the radon from dropping into the detection energy band of the sought pollutant. Thus, the GEIGER law is written:

$$P_{(cm)} = 0.32 \times E^{3/2} \text{ (MeV) (at atmospheric pressure)} \quad (2)$$

and by combining the two above equations (1) and (2), it is found that:

$$(r^2 + d^2)^{1/2} - d = 0.32 \times (E_1^{3/2} - E_0^{3/2}) \quad (3)$$

in which $E_1$ is the energy of the spurious elements, and $E_0$ is the energy of the sought pollutant.

The optimization consists of seeking value d and r pairs satisfying equation (3).

Table 1 below gives value d, r pairs in mm for a pressure of 1 bar, when it is wished to detect plutonium 238 (emission energy $E_0 = 5.5$ MeV) and the atmosphere contains progenies of radium A or thorium C, whose emission energy $E_1$ is 6 MeV.

TABLE 1

| d in mm | r in mm | Useful surface S in mm² of detector and filter | |
|---|---|---|---|
| 3 | 8.2 | 211 | |
| 3.5 | 8.5 | 227 | |
| 4 | 8.8 | 243 | p = 1 bar |
| 4.5 | 9.2 | 265 | |
| 5 | 9.5 | 283 | |

Operation at a different pressure leads to a different optimized geometry, because the GEIGER law must be modified as a function of the pressure at which working takes place. Table 2 below gives d, r value pairs usable when operating at 0.7 bar.

TABLE 2

| d in mm | r in mm | Useful surface S in mm² | |
|---|---|---|---|
| 3 | 10.8 | 369 | |
| 3.5 | 11.2 | 395 | |
| 4 | 11.6 | 420 | p = 0.7 bar |
| 4.5 | 11.9 | 447 | |
| 5 | 12.3 | 473 | |

Figure 4:
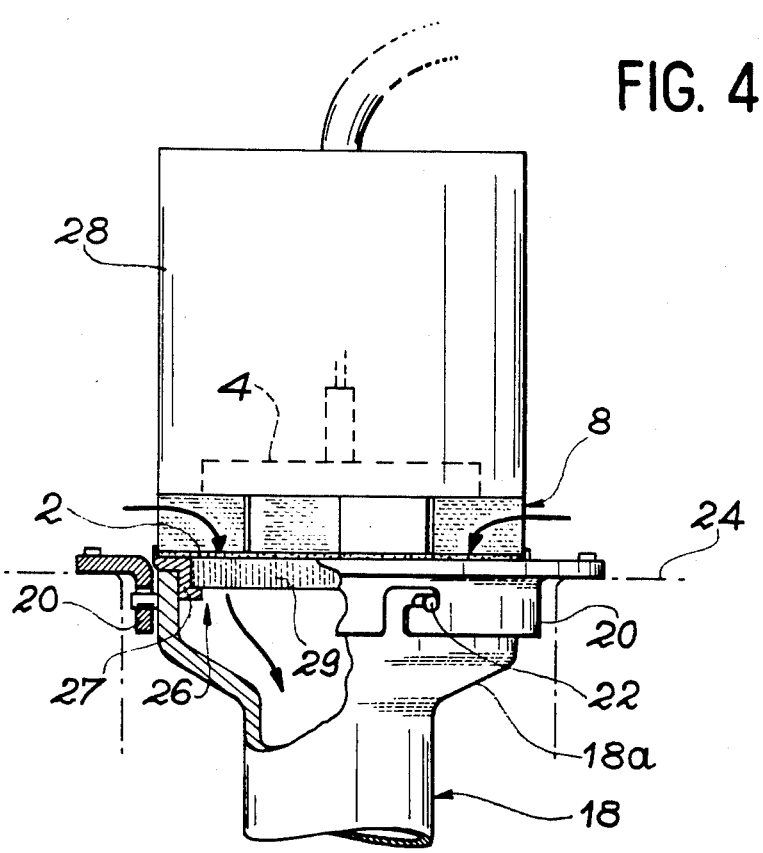
FIG. 4 a diagrammatic view in elevation and partly in section illustrating a possible arrangement of the apparatus according to the invention.

FIG. 4 illustrates a possible arrangement of the apparatus according to the invention for carrying out direct atmospheric sampling (sampling at a more remote point would require a much more complex arrangement). The apparatus of FIG. 4 comprises a tube 18 used for sucking in the atmosphere to be checked, the upper part 18a of the tube 18 being widened. A support part 20 is mounted on portion 18a of tube 18 by means of lugs 22. Part 20 is also fixed to a table or another support 24 diagrammatically represented in mixed lines in FIG. 4. The portion 18a of tube 18 also supports a filter holder 26, which supports the filter 2. Grid 8, identical to that illustrated in FIG. 3, forms the mechanical connection between support 20 and detector 4 within box 28, the latter also containing all the electronics associated with the detector 4. Filter holder 26 comprises a circular portion 27 supporting a fritted or perforated central disk 29 allowing the passage of the air flow, while retaining the actual filter 2.

Thus, the apparatus according to the invention has numerous advantages, because it enables detection of alpha particle emitting aerosols by a direct measurement and without the measurement being disturbed by spurious energies due to radon derivatives. The apparatus can easily be realised and can be combined with a simple device, like that of FIG. 4, which reduces the manufacturing costs thereof.

What is claimed is:

1. An apparatus for checking atmospheric pollution due to alpha particle-emitting aerosols of the type comprising a flat filter for retaining the aerosols, a detector having a planar face positioned facing the filter and parallel thereto and a grid arranged between the filter and said planar face of the detector, wherein the grid comprises a plurality of plates arranged both radially and perpendicularly to the filter and to the planar face of the detector extending over the entire distance between the filter and said planar face and defining cells, each of which is open towards the outside of the space between the filter and said planar face of the detector.

2. An apparatus according to claim 1, wherein the filter and the planar face of the detector are circular, thus defining a cylindrical space, and wherein the plates constituting the grid pass through the axis of said cylindrical space and form cells shaped like sectors open towards the outside.

* * * * *